(12) United States Patent
Schmit

(10) Patent No.: US 7,189,042 B1
(45) Date of Patent: Mar. 13, 2007

(54) BALE TRANSPORT SYSTEM

(76) Inventor: Ronald E. Schmit, 9340 County Rd., 7, Fairmount, ND (US) 58030

(\*) Notice: Subject to any disclaimer, the term of this patent is extended or adjusted under 35 U.S.C. 154(b) by 0 days.

(21) Appl. No.: 11/372,314

(22) Filed: Mar. 8, 2006

(51) Int. Cl.
*B60P 7/08* (2006.01)

(52) U.S. Cl. .................. 410/100; 410/97; 296/98; 296/100.15

(58) Field of Classification Search .................. 410/96, 410/97, 100; 296/98, 100.11, 100.13, 100.14, 296/100.15, 100.16, 100.18; 160/67, 71, 160/80, 241, 323.1
See application file for complete search history.

(56) References Cited

U.S. PATENT DOCUMENTS

| | | | |
|---|---|---|---|
| 1,784,248 A | 12/1930 | Nolen et al. | |
| 1,786,048 A | 12/1930 | Williams | |
| 4,505,512 A | 3/1985 | Schmeichel et al. | |
| 4,842,323 A | 6/1989 | Trickett | |
| 5,152,575 A | 10/1992 | DeMonte et al. | |
| 5,271,336 A | 12/1993 | Willetts | |
| 5,549,347 A | 8/1996 | Anderson | |
| 5,573,295 A | 11/1996 | Haddad, Jr. | |
| 5,658,037 A | 8/1997 | Evans et al. | |
| 5,765,901 A | 6/1998 | Wilkens | |
| 5,822,957 A | 10/1998 | Esch | |
| 5,876,164 A * | 3/1999 | Hamelin et al. | ............... 410/35 |
| 5,911,467 A | 6/1999 | Evans et al. | |
| 6,183,036 B1 | 2/2001 | Coulson | |
| 6,199,935 B1 | 3/2001 | Waltz et al. | |
| 6,237,985 B1 | 5/2001 | O'Brian | |
| 6,322,041 B1 | 11/2001 | Schmeichel | |
| 6,511,117 B1 | 1/2003 | Henning | |
| 6,513,856 B1 | 2/2003 | Swanson et al. | |
| 6,641,199 B1 | 11/2003 | Hicks | |
| 6,695,382 B2 | 2/2004 | Ciferri et al. | |
| 6,742,828 B2 | 6/2004 | Smith | |
| 6,779,828 B1 | 8/2004 | Poyntz | |
| 6,783,168 B2 | 8/2004 | Searfoss | |
| 6,926,337 B2 | 8/2005 | Poyntz | |

\* cited by examiner

*Primary Examiner*—Stephen Gordon

(57) ABSTRACT

A bale transport system for protecting bales from the weather during transportation upon a trailer. The bale transport system includes a trailer, a frame attached to the trailer, a cover positioned upon the frame, a first spool and a second spool connected to opposing portions of the cover, a pair of rear supports and a pair of front supports connected to the spools, and a pair of cranks connected to the spools for rotating the spools. The frame may be vertically adjustable in a telescoping manner to comply with various height restrictions.

20 Claims, 12 Drawing Sheets

BALE TRANSPORT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to bale transportation devices and more specifically it relates to a bale transport system for protecting bales from the weather during transportation upon a trailer.

2. Description of the Related Art

Any discussion of the prior art throughout the specification should in no way be considered as an admission that such prior art is widely known or forms part of common general knowledge in the field.

Trailers for hauling bales (e.g. hay, straw) have been in use for years. Conventional trailers for hauling bales are comprised of a flat-bed trailer structure that is connectable to a truck for moving the trailer with a load of bales positioned thereupon. The problem with conventional bale hauling trailers is that they expose the bales directly to the sun and weather (e.g. rain, wind). Conventional tarps may be manually positioned about and removed from the bales, but this is time consuming and requires the user to climb upon the load of bales.

While these devices may be suitable for the particular purpose to which they address, they are not as suitable for protecting bales from the weather during transportation upon a trailer. Conventional bale covering tarps are time consuming and relatively dangerous to install and uninstall.

In these respects, the bale transport system according to the present invention substantially departs from the conventional concepts and designs of the prior art, and in so doing provides an apparatus primarily developed for the purpose of protecting bales from the weather during transportation upon a trailer.

BRIEF SUMMARY OF THE INVENTION

In view of the foregoing disadvantages inherent in the known types of bale protection systems now present in the prior art, the present invention provides a new bale transport system construction wherein the same can be utilized for protecting bales from the weather during transportation upon a trailer.

The general purpose of the present invention, which will be described subsequently in greater detail, is to provide a new bale transport system that has many of the advantages of the bale protection systems mentioned heretofore and many novel features that result in a new bale transport system which is not anticipated, rendered obvious, suggested, or even implied by any of the prior art bale protection systems, either alone or in any combination thereof.

To attain this, the present invention generally comprises a trailer, a frame attached to the trailer, a cover positioned upon the frame, a first spool and a second spool connected to opposing portions of the cover, a pair of rear supports and a pair of front supports connected to the spools, and a pair of cranks connected to the spools for rotating the spools. The frame may be vertically adjustable in a telescoping manner to comply with various height restrictions.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a bale transport system that will overcome the shortcomings of the prior art devices.

A second object is to provide a bale transport system for protecting bales from the weather during transportation upon a trailer.

Another object is to provide a bale transport system that may be utilized upon existing and new flat-bed trailers.

An additional object is to provide a bale transport system that protects bales in various types of weather.

A further object is to provide a bale transport system that can be operated from the ground and does not require the user to climb upon the bales.

Another object is to provide a bale transport system that simultaneously covers the bales and lowers the bale straps upon the bales.

A further object is to provide a bale transport system that reduces the amount of time to load and unload bales.

Another object is to provide a bale transport system that is adjustable in height to comply with various height requirements for trailers.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
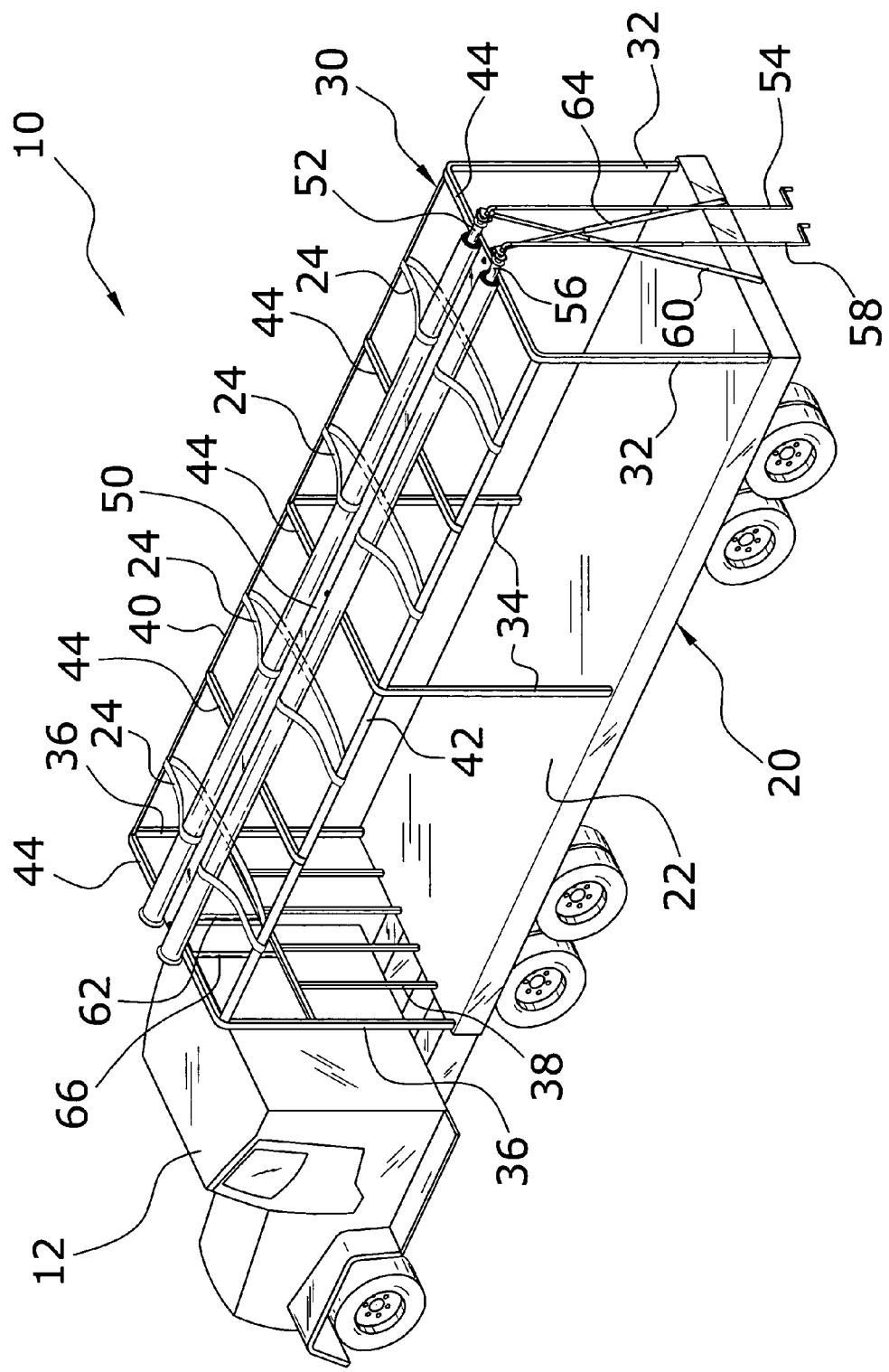
FIG. 1 is an upper perspective view of the present invention.

Turning now descriptively to the drawings, in which similar reference characters denote similar elements throughout the several views, FIGS. 1 through 12 illustrate a bale transport system 10, which comprises a trailer 20, a frame 30 attached to the trailer 20, a cover 50 positioned upon the frame 30, a first spool 52 and a second spool 56 connected to opposing portions of the cover 50, a pair of rear supports and a pair of front supports connected to the spools, and a pair of cranks connected to the spools for rotating the spools. The frame 30 may be vertically adjustable in a telescoping manner to comply with various height restrictions.

B. Trailer

FIGS. 1 through 12 illustrate an exemplary trailer 20 suitable for use with the present invention. The trailer 20 preferably has a deck 22 that is capable of receiving and supporting a plurality of bales 14 regardless of the shape of the bales 14. The trailer 20 is preferably connectable to a truck 12 or tractor. It can also be appreciated that the trailer 20 may be part of the truck 12 or tractor instead of removably attachable from the truck 12 or tractor.

C. Frame

Figure 2:
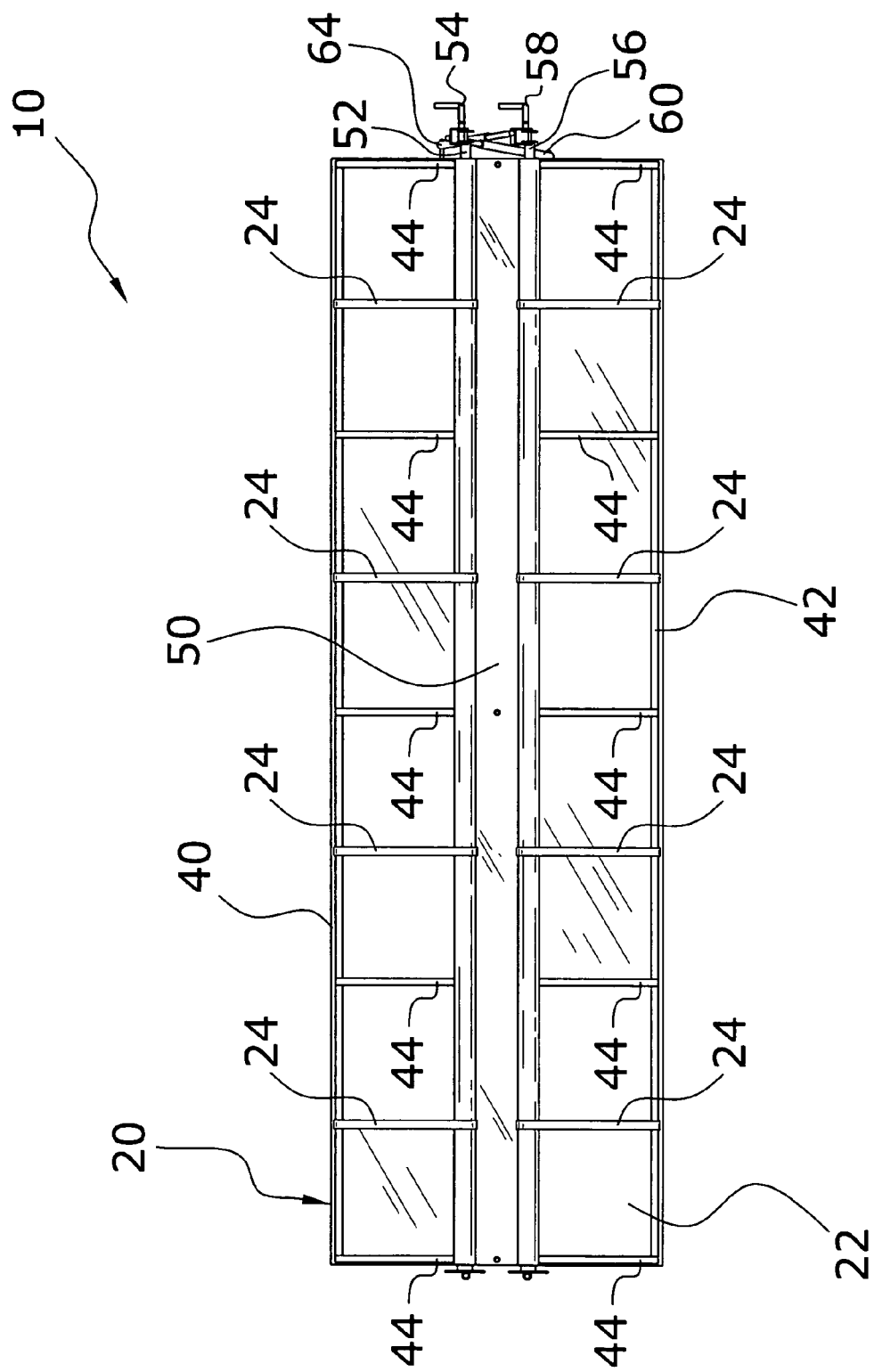
FIG. 2 is a top view of the present invention.
Figure 3:
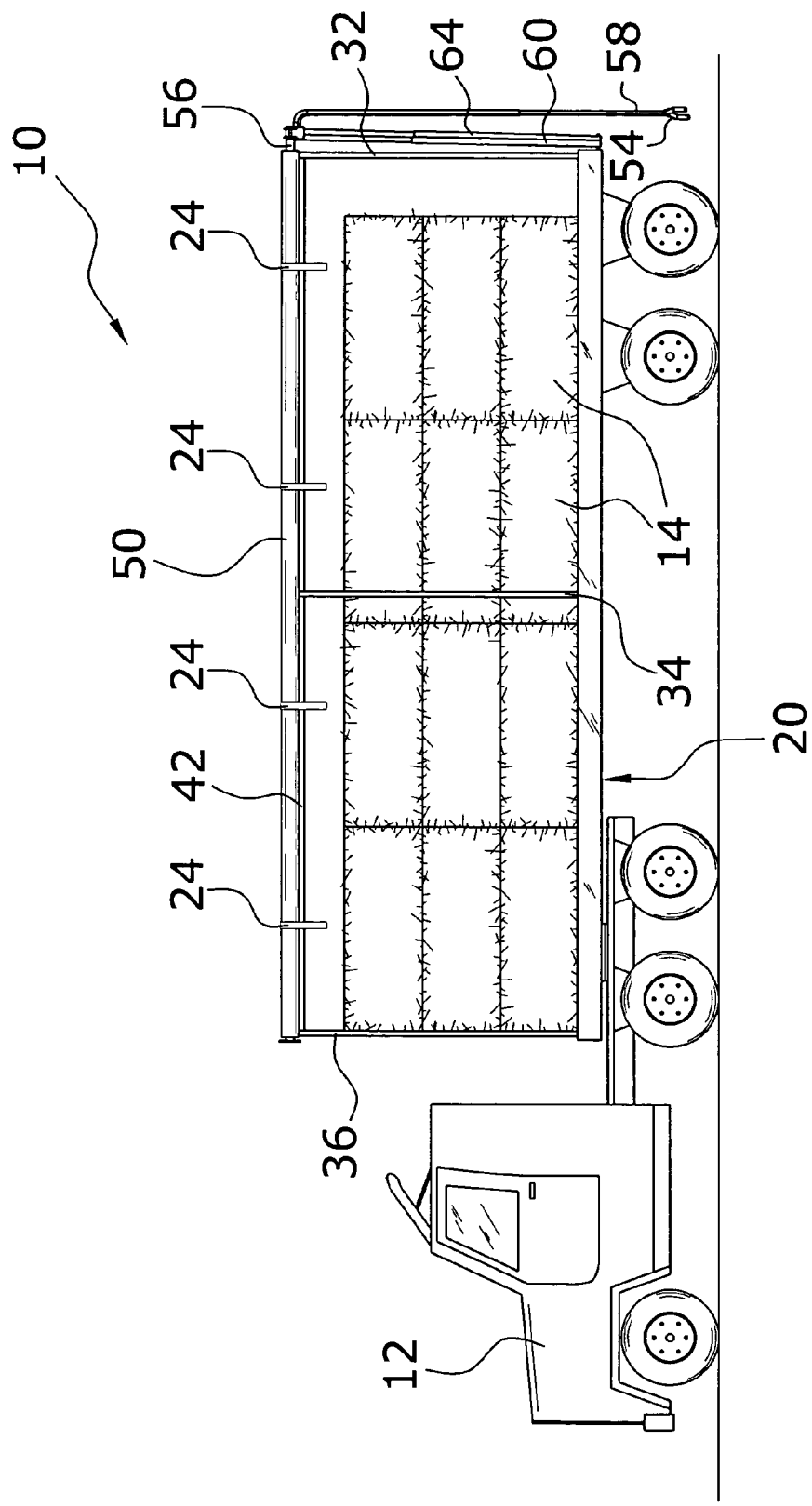
FIG. 3 is a side view of the present invention.
Figure 4:
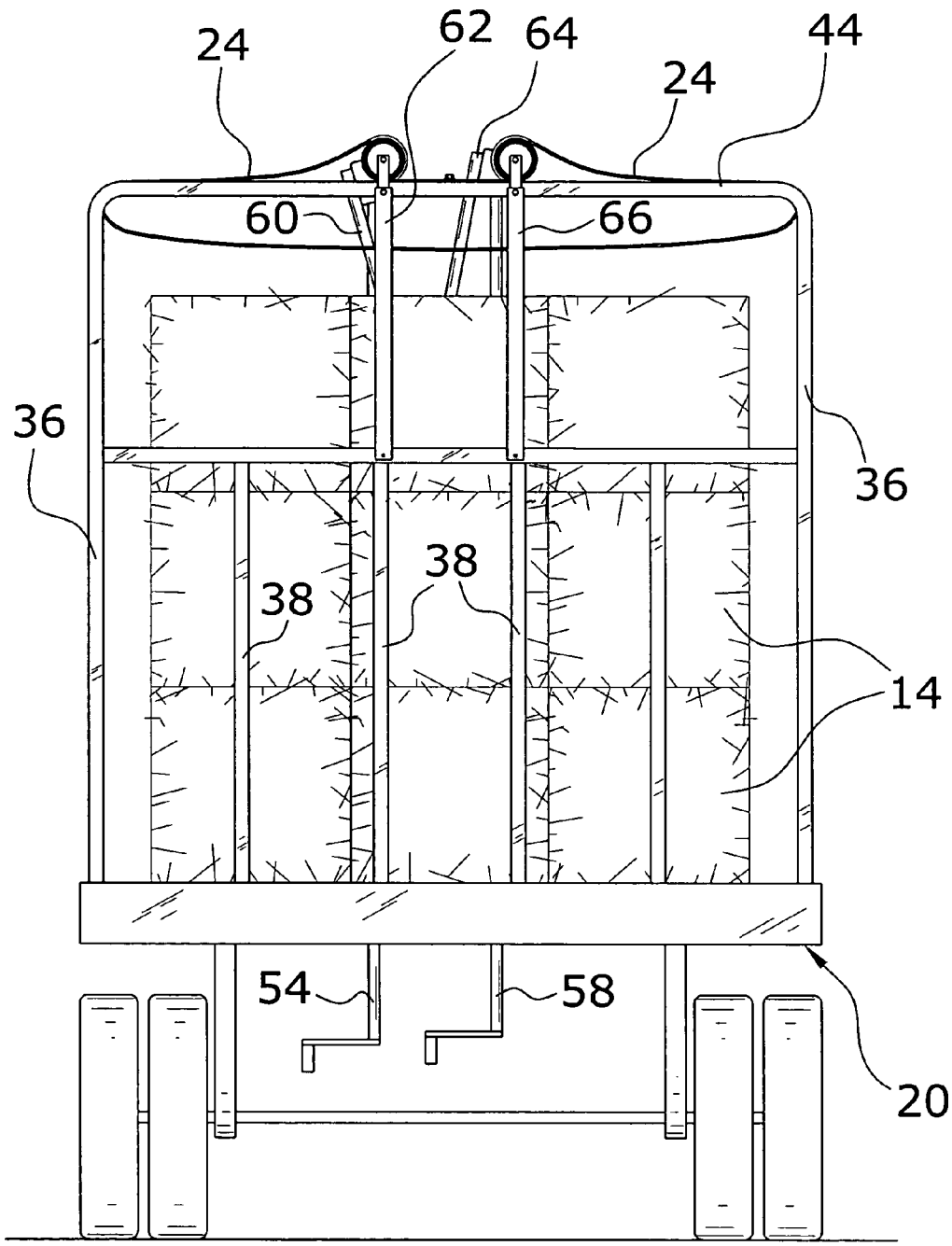
FIG. 4 is a front view of the present invention.
Figure 9:
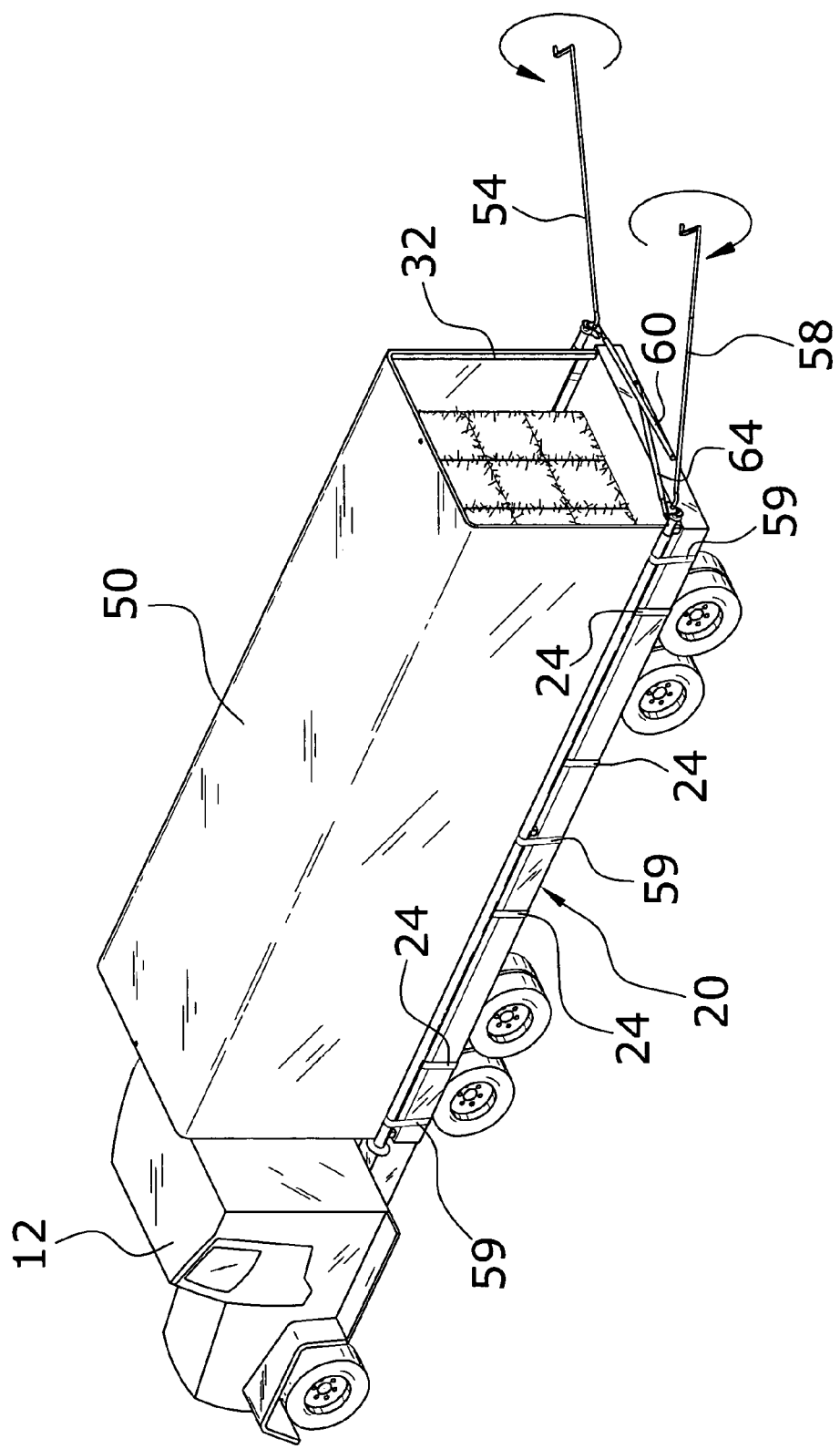
FIG. 9 is an upper perspective view of the present invention covering the load of bales.

FIGS. 1 through 4 best illustrate the frame 30. The frame 30 is attached to the trailer 20 either permanently or removably. The frame 30 extends upwardly from the deck 22 of the trailer 20 and has a shape and a size sufficient to surround a load of bales 14 as illustrated in FIGS. 3, 4 and 9 of the drawings. The frame 30 is preferably comprised of a tubular metal structure, however various other materials may be utilized to construct the frame 30. The frame 30 may also have various other shapes other than illustrated in the attached figures. The frame 30 preferably forms a substantially elongated rectangular box structure for surrounding the load of bales 14 as shown in FIGS. 1 and 9 of the drawings. The frame 30 is preferably comprised of a stationary structure, however the frame 30 may be adjustable to accommodate various loads of bales 14.

The frame 30 is preferably comprised of a pair of rear members 32, a pair of middle members 34, a pair of front members 36, a left side member 42 and a right side member 40, and a plurality of cross members 44 as illustrated in FIGS. 1 through 4 of the drawings. The left side member 42 and the right side member 40 are connected to the corresponding upper end ends of the pair of rear members 32, the pair of middle members 34 and the pair of front members 36 as best illustrated in FIG. 1 of the drawings. The cross members 44 preferably between the right side member 40 and the left side member 42 as illustrated in FIGS. 1 and 2 of the drawings. The cross members 44 are distally spaced apart and support the cover 50 when in the closed position and the open position. The cross members 44 are preferably substantially parallel to one another as shown in FIG. 2 of the drawings.

The frame 30 further preferably includes a front stopper structure 38 attached between the pair of front members 36 as illustrated in FIG. 1 of the drawings. The front stopper structure 38 assists in maintaining the bales 14 in the preferred longitudinal location on the deck 22 of the trailer 20. The front stopper structure 38 is preferably comprised of a plurality of smaller height vertical members with a horizontal member extending along the top of the vertical members and attached between the front members 36 as shown in FIGS. 1 and 4 of the drawings.

D. Cover

Figure 8:
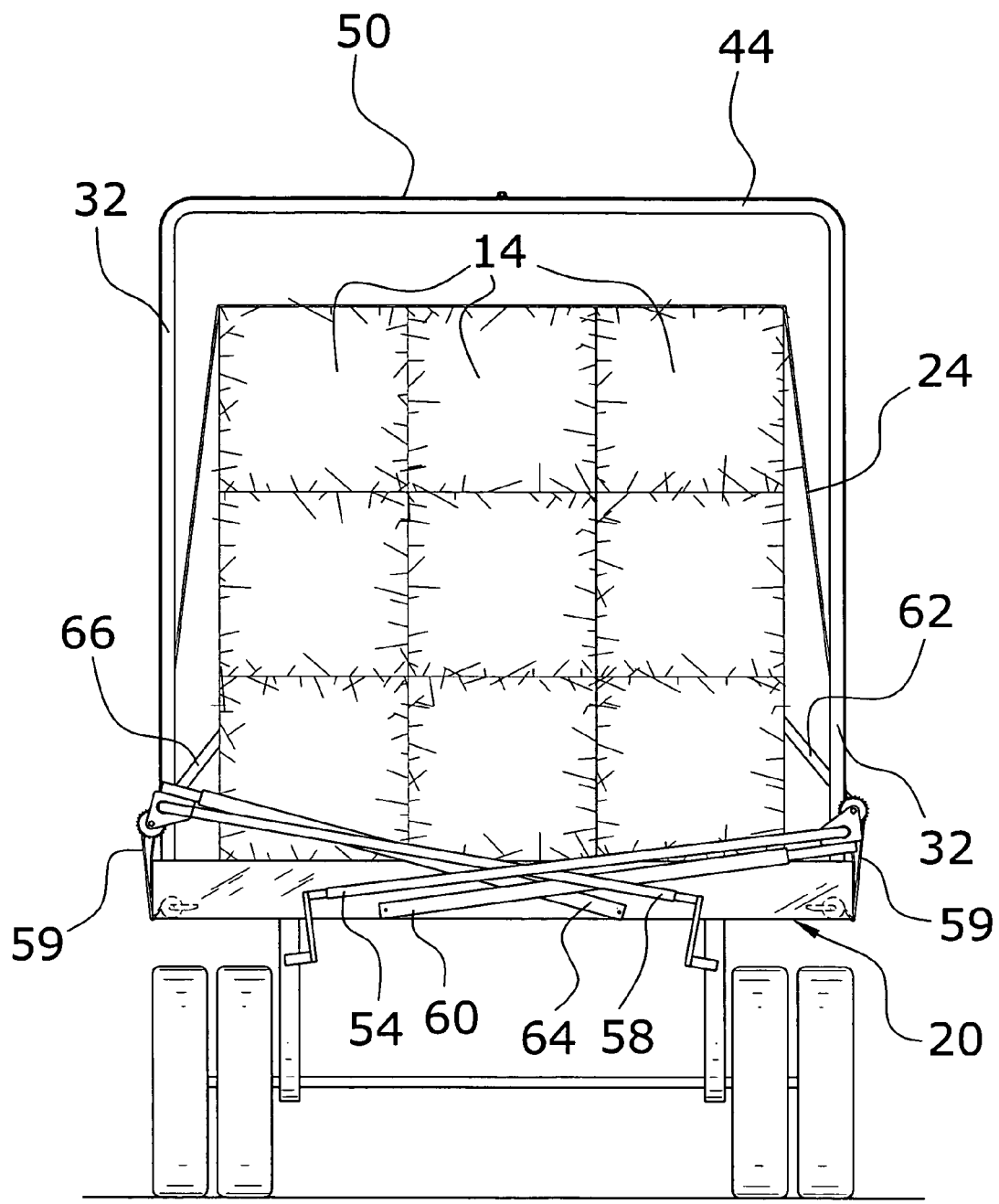
FIG. 8 is a rear view of the present invention with the cover completely surrounding the load of bales and the bale straps fully secured.

FIGS. 1 and 9 best illustrate the cover 50. The cover 50 is positioned upon the frame 30 in either an open position (FIG. 1) or a closed position (FIG. 9). The cover 50 is preferably comprised of a single and unitary structure that is secured to a central location of the frame 30 with conventional fasteners as illustrated in FIGS. 8 and 9 of the drawings.

However, the cover 50 may be comprised of a plurality of sections connected or disconnected from one another. The cover 50 may be comprised of various materials capable of preventing the weather from penetrating into the bales 14 surrounded by the cover 50. The cover 50 is preferably comprised of a water impermeable material and is sized to extend about the top and sides of the bales 14.

E. Spools

A first spool 52 and a second spool 56 are connected to opposing portions of the cover 50 as best illustrated in FIGS. 1 and 2 of the drawings. The spools 52, 56 are comprised of an elongated structure and preferably extend along a substantial portion of the length of the frame 30 and the length of the cover 50 as shown in FIG. 1 of the drawings. The spools 52, 56 are preferably comprised of a relatively rigid and rounded structure capable of receiving and dispensing the cover 50 by the rolling thereof about the frame 30. The spools 52, 56 are preferably supported upon an upper portion of the frame 30 during the operation of the present invention as shown in FIGS. 1 and 5 of the drawings.

F. Front and Rear Supports

Figure 5:
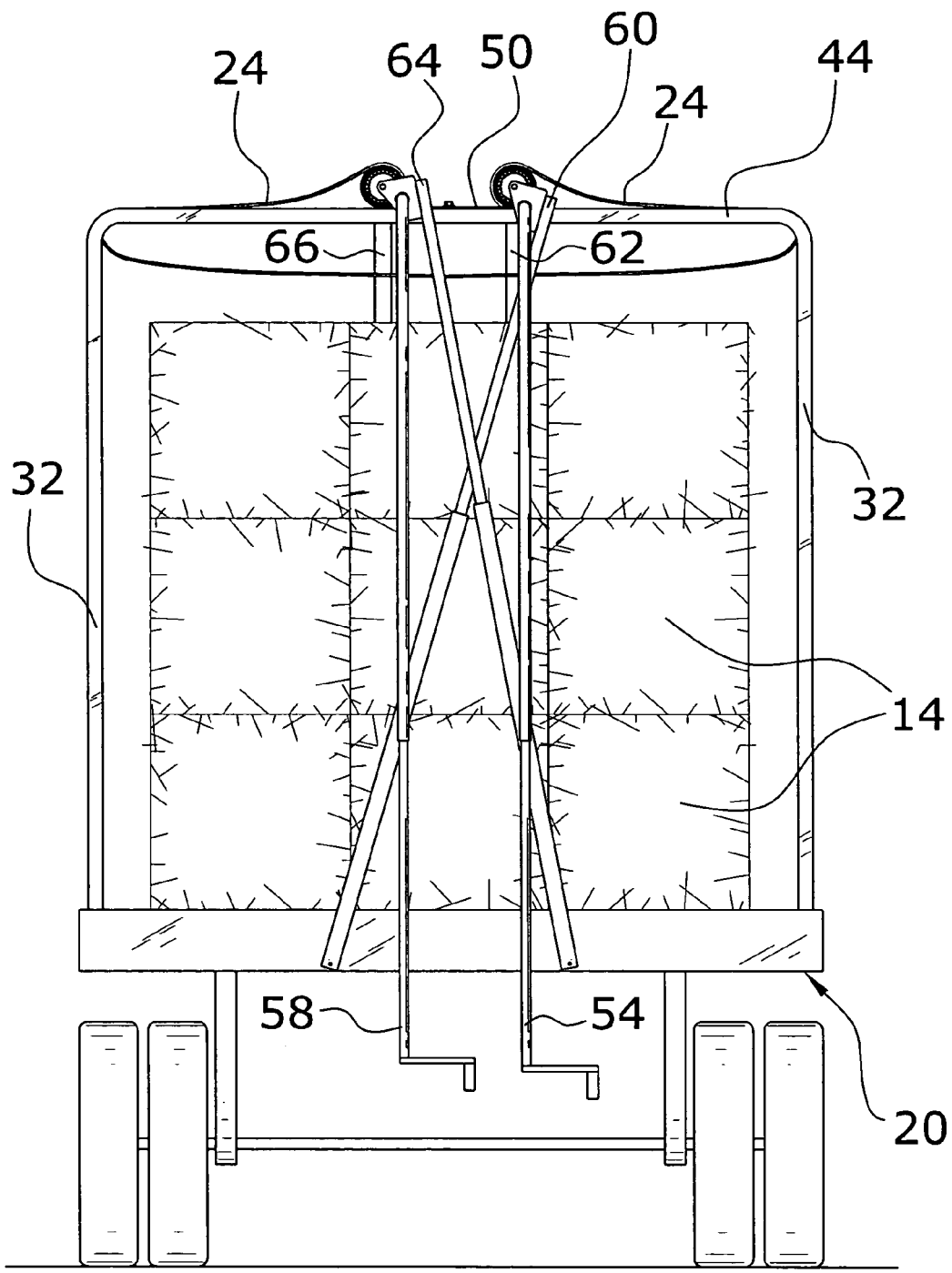
FIG. 5 is a rear view of the present invention.

A first rear support 60 is connected between the trailer 20 and a rear end of the first spool 52 for supporting the rear end of the first spool 52 as shown in FIG. 5 of the drawings. A second rear support 64 is connected between the trailer 20 and a rear end of the second spool 56 for supporting the rear end of the second spool 56. The first rear support 60 and the second rear support 64 are each preferably comprised of telescoping structures to conform to the varying distances encountered while supporting the spools 52, 56 during operation as shown in FIGS. 5 through 8 of the drawings. The first rear support 60 and the second rear support 64 preferably have a biasing structure that draws the spools 52, 56 inwardly so that the spools 52, 56 are in constant engagement with the perimeter of the frame 30 as shown in FIGS. 5 through 8 of the drawings.

A first front support 62 is connected between the trailer 20 and a front end of the first spool 52 for supporting the front end of the first spool 52 as shown in FIG. 4 of the drawings. A second front support 66 is connected between the trailer 20 and a front end of the second spool 56 for supporting the front end of the second spool 56. The first front support 62 and the second front support 66 are each preferably comprised of telescoping structures to conform to the varying distances encountered while supporting the spools 52, 56 during operation of the invention. The first front support 62 and the second front support 66 preferably have a biasing structure that draws the spools 52, 56 inwardly so that the spools 52, 56 are in constant engagement with the perimeter of the frame 30.

G. Cranks

A first crank 54 is connected to the first spool 52 and a second crank 58 is connected to the second spool 56 for allowing rotational manipulation of the spools 52, 56 with respect to the frame 30 during opening and closing of the cover 50. The first crank 54 and the second crank 58 are preferably comprised of a manually operated hand crank structure that is geared down to assist with the relatively heavy spools 52, 56 and corresponding cover 50. The first crank 54 and the second crank 58 may be comprised of a powered device (e.g. hydraulic or electric) as an alternative to the hand operated configuration shown in the drawings.

H. Bale Straps

A plurality of bale straps 24 are preferably removably positioned within the cover 50 and the spools when the cover 50 is in the open position as shown in FIGS. 1, 2 and 4 of the drawings. The bale straps 24 are comprised of any elongated strap structure capable of securing a load of bales 14 upon the deck 22 of the trailer 20 as illustrated in FIG. 8 of the drawings.

Figure 6:
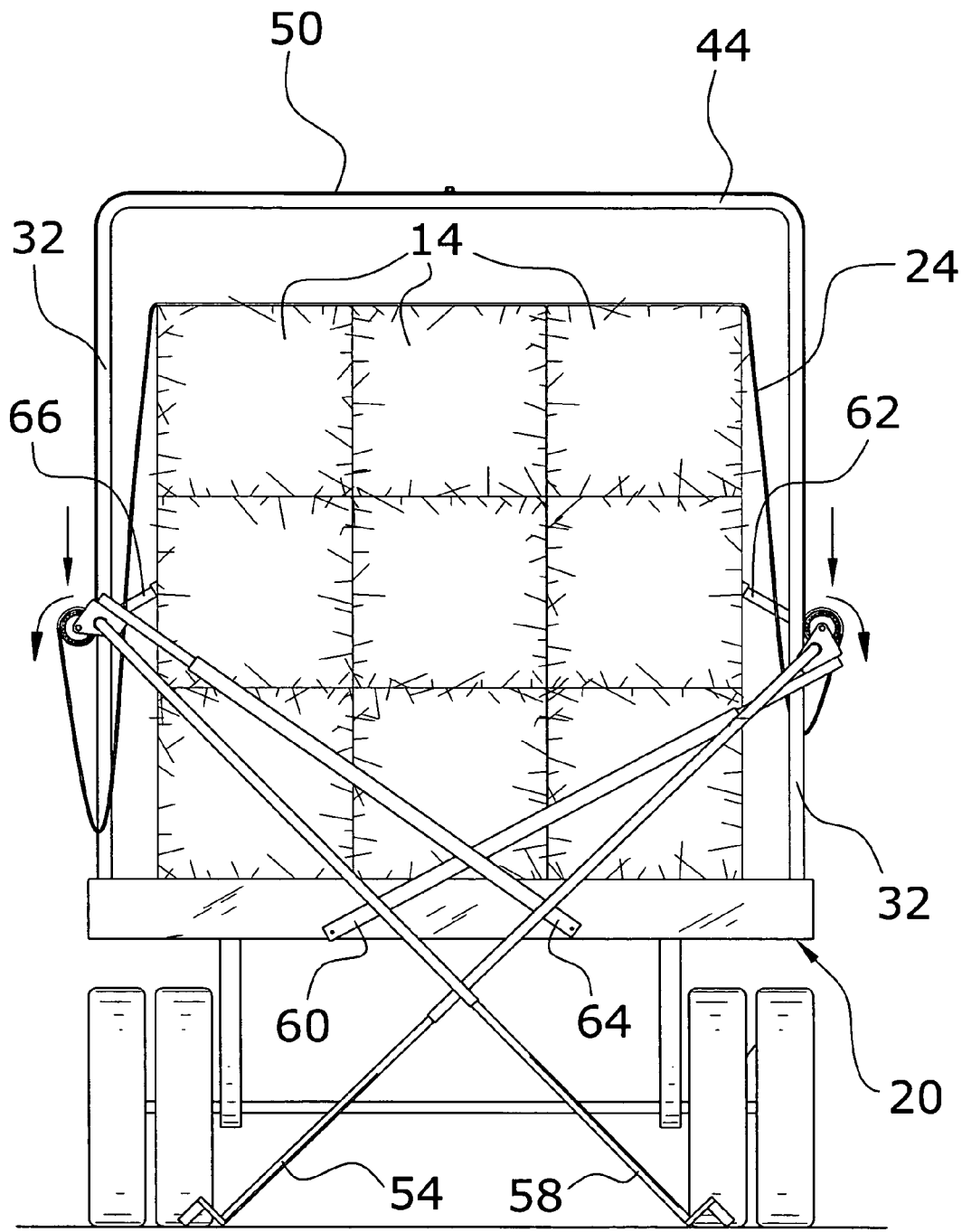
FIG. 6 is a rear view of the present invention with the cover partially closed upon a load of bales.

The plurality of bale straps 24 are positionable about a load of bales 14 as shown in FIG. 8 of the drawings. A first portion of the plurality of bale straps 24 is preferably positioned within the cover 50 and the first spool 52 when the cover 50 is in the open position as shown in FIG. 5 of the drawings. A second portion of the plurality of bale straps 24 is preferably positioned within the cover 50 and the second spool 56 when the cover 50 is in the open position as shown in FIG. 5 of the drawings. The first portion and the second portion of the plurality of bale straps 24 are on opposite ends of the plurality of bale straps 24 as best illustrated in FIG. 5 of the drawings. The bale straps 24 are preferably substantially parallel to one another and have a portion hanging downwardly from the spools 52, 56 as shown in FIG. 5 of the drawings when the cover 50 is in the open position. As the cover 50 is extended to the open position the bale straps 24 are correspondingly dispensed from the spools 52, 56 by the rotation of the spools 52, 56 as shown in FIGS. 6, 7 and 8 of the drawings.

I. Securing Straps

Figure 7:
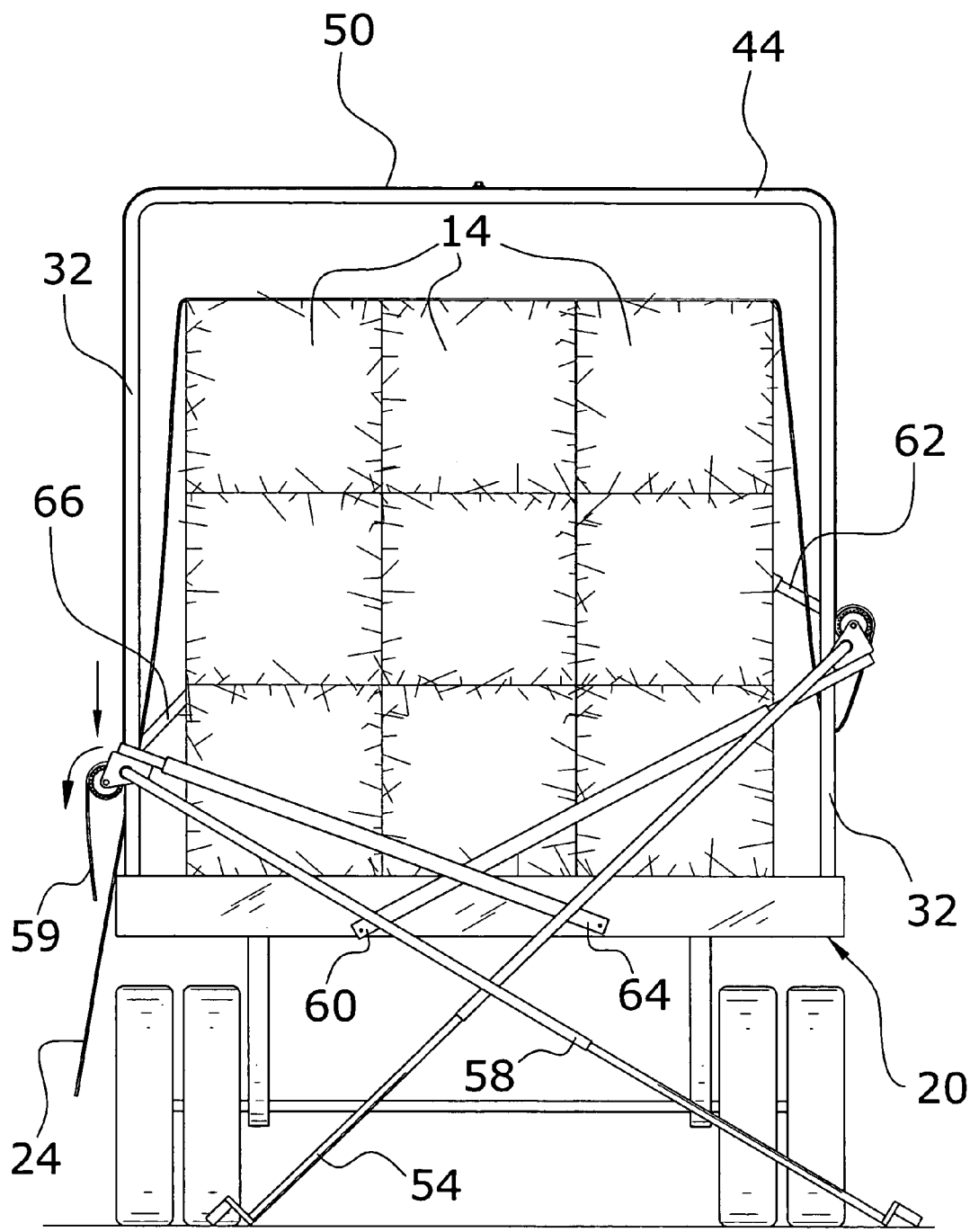
FIG. 7 is a rear view of the present invention with the left portion of the cover continuing to extend downwardly with the bale straps completely removed from thereof.

A plurality of securing straps are attached to the first spool 52 or the cover 50 along with the second spool 56 or cover 50 as shown in FIGS. 7, 8 and 9 of the drawings. The plurality of first securing straps 59 and the plurality of second securing straps 59 are attachable to the trailer 20 utilizing conventional winches on the trailer 20 that are hand or mechanically operated. The securing straps 59 are drawn taut by both the winches on the trailer 20 and the rotation of the cranks 54, 58 as shown in FIG. 9 of the drawings. The securing straps 59 are dispensed from the spools 52, 56 as the latter portion of the cover 50 is dispensed as best illustrated in FIG. 6 of the drawings.

J. Vertically Adjustable Frame

Figure 10:
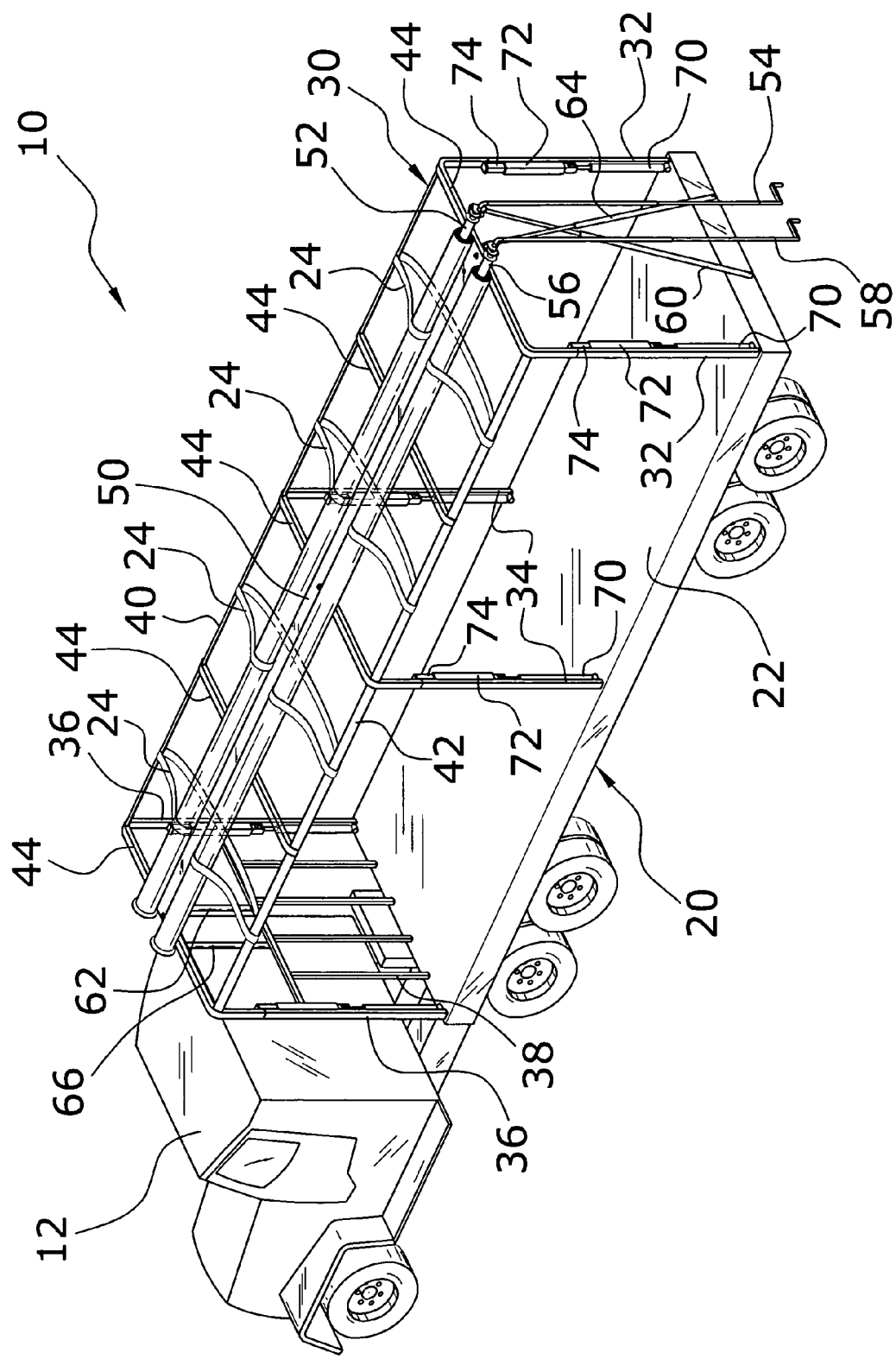
FIG. 10 is an upper perspective view of an alternative embodiment of the present invention that is vertically adjustable.
Figure 11:
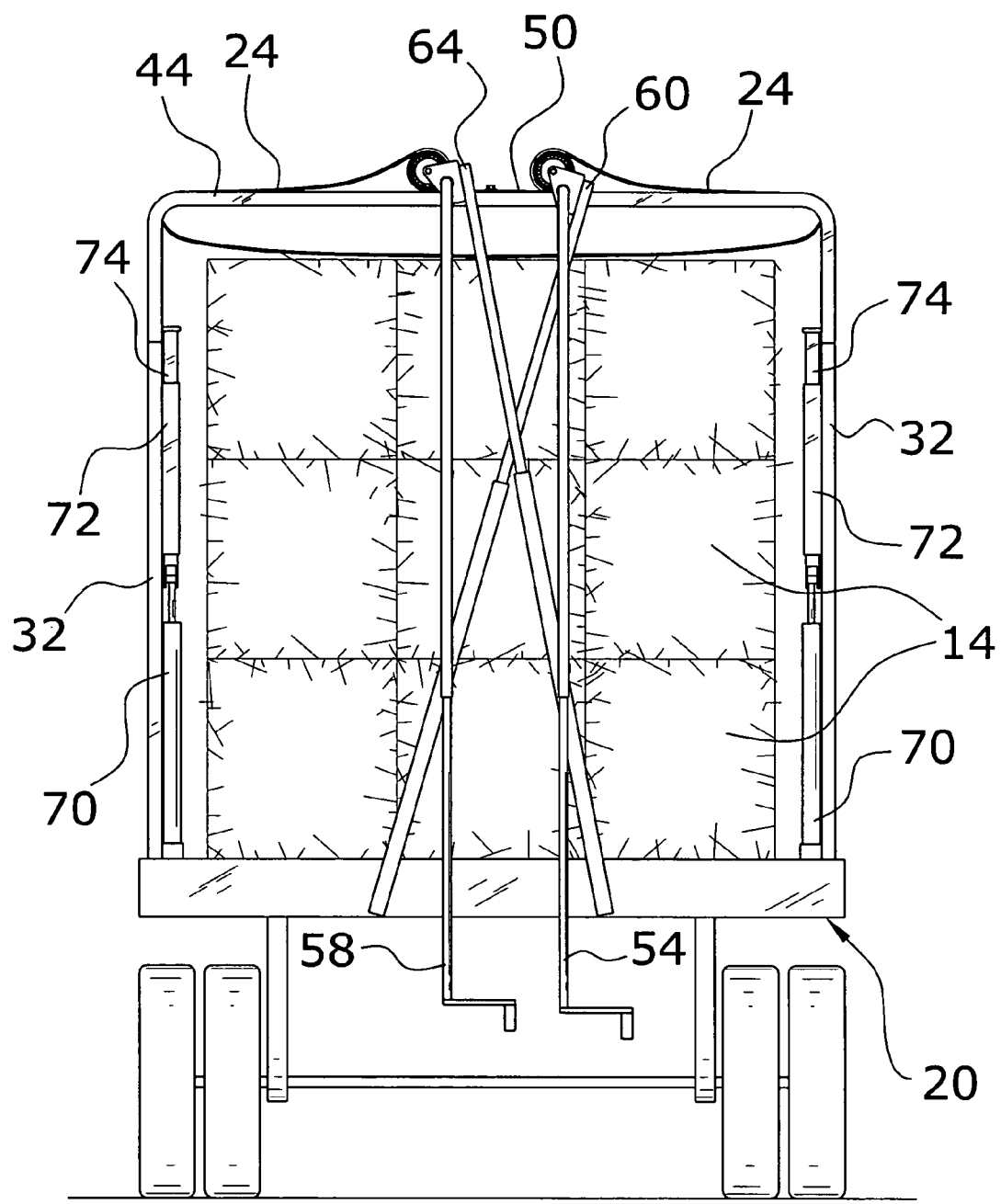
FIG. 11 is rear view of the alternative embodiment in the lowered position.
Figure 12:
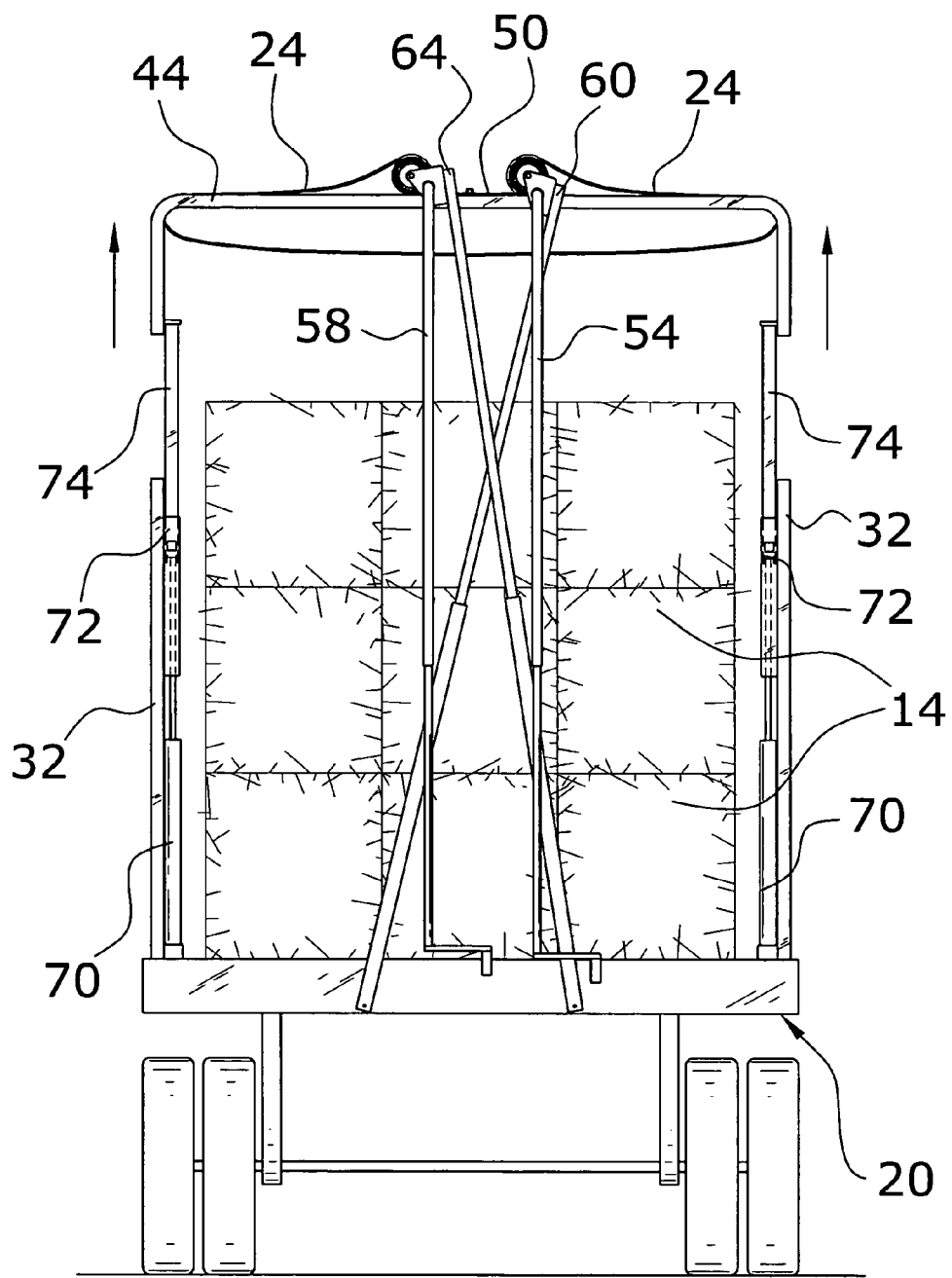
FIG. 12 is rear view of the alternative embodiment in the raised position.

FIGS. 10 through 12 illustrate an alternative embodiment comprised of a frame 30 having a vertically adjustable structure to comply with various height restrictions for trailers 20 based upon local law and to accommodate various sizes of loads. As best illustrated in FIGS. 11 and 12 of the drawings, the frame 30 is comprised of a plurality of vertical support members, a plurality of actuators 70 connected to the vertical support members, a plurality of guide members 72 connected to the vertical support members, a plurality of telescoping members 74 slidably positioned within the plurality of guide members 72, and an upper structure connected to an upper end of each of the plurality of telescoping members 74. The actuators 70 may be comprised of hydraulic cylinders or electrical devices. The actuators 70 may also be hand operated through a mechanical structure.

K. Operation of Invention

In use, the user first loads the bales 14 upon the deck 22 of the trailer 20 as shown in FIGS. 2, 4 and 5 of the drawings. The user then operates the cranks 54, 58 to cause the spools 52, 56 to rotate counter to one another resulting in the dispensing of the cover 50 on opposite sides of a center point as shown in FIG. 6 of the drawings. As the spools 52, 56 rotate counter to and away from one another, the spools 52, 56 move outwardly along an upper portion of the frame 30 and then downwardly along the sides of the frame 30 as shown in FIG. 6 of the drawings. During the dispensing of the cover 50 by the spools 52, 56, the bale straps 24 are simultaneously dispensed by the rotation of the spools 52, 56 thereby allowing the bale straps 24 to be positioned upon the load of bales 14 as shown in FIG. 6 of the drawings. The spools 52, 56 continue to rotate and then a plurality of securing straps 59 are exposed as illustrated in FIG. 7 of the drawings. The securing straps 59 are attached to the spools 52, 56 (or cover 50). The securing straps 59 are utilized for securing the spools 52, 56 and the cover 50 to the trailer 20 when the cover 50 is in the closed position as shown in FIG. 9 of the drawings. Once the cover 50 is in the closed position, the bale straps 24 are secured to the trailer 20 to ensure that the load of bales 14 do not shift during transportation. The securing straps 59 are also secured to the trailer 20 to ensure that the spools 52, 56 and cover 50 do not move along with ensuring that the cover 50 remains taut. The user may counter-rotate the spools 52, 56 after securing the securing straps 59 to the trailer 20 to ensure that the cover 50 remains taut.

When the user reaches their unloading destination, the above process is simply reversed thereby preparing the present invention automatically for the next load of bales 14. As the spools 52, 56 are rotated to cause the cover 50 to be loaded upon the spools 52, 56, the securing straps 59 are wrapped around the spools 52, 56 and within the cover 50 accordingly. In addition, the bale straps 24 are also wrapped around the spools 52, 56 and within the cover 50 accordingly until everything is returned to its original open position as shown in FIG. 5 of the drawings.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A bale transport system, comprising:
   a trailer;
   a frame attached to said trailer, wherein said frame is formed to surround a load of bales;
   a cover positioned upon said frame, wherein said cover has an open position and a closed position with respect to said frame;
   a first spool and a second spool connected to opposing portions of said cover;
   a first rear support connected between said trailer and a rear end of said first spool;
   a first front support connected between said trailer and a front end of said first spool;
   a second rear support connected between said trailer and a rear end of said second spool;
   a second front support connected between said trailer and a front end of said second spool;
   a first crank connected to said first spool;
   a second crank connected to said second spool; and
   a plurality of bale straps removably positioned within said cover and said spools when said cover is in said open position.

2. The bale transport system of claim 1, wherein said first rear support and said second rear support are comprised of telescoping structures.

3. The bale transport system of claim 1, wherein said first front support and said second front support are comprised of telescoping structures.

4. The bale transport system of claim 1, wherein said cover is comprised of a single and unitary structure.

5. The bale transport system of claim 1, wherein said cover is secured to said frame.

6. The bale transport system of claim 5, wherein said cover is secured to a central location of said frame.

7. The bale transport system of claim 1, a wherein said plurality of bale straps are positionable about a load of bales, wherein a first portion of said plurality of bale straps are positioned within said cover and said first spool when said cover is in said open position, and wherein a second portion of said plurality of bale straps are positioned within said cover and said second spool when said cover is in said open position.

8. The bale transport system of claim 7, wherein said first portion and said second portion of said plurality of bale straps are opposite of one another.

9. The bale transport system of claim 8, wherein said plurality of bale straps are substantially parallel to one another.

10. The bale transport system of claim 7, including a plurality of first securing straps attached to said first spool or said cover, and a plurality of second securing straps attached to said second spool or said cover, wherein said plurality of first securing straps and said plurality of second securing straps are attachable to said trailer.

11. The bale transport system of claim 1, wherein said frame is comprised of a pair of rear members, a pair of middle members, a pair of front members, a left side member and a right side member connected to said pair of rear members, said pair of middle members and said pair of front members, and a plurality of cross members extending between said right side member and said left side member.

12. The bale transport system of claim 1, wherein said first crank and said second crank are manually operated.

13. The bale transport system of claim 1, wherein said frame includes a front stopper structure.

14. The bale transport system of claim 1, wherein said frame forms a substantially elongated rectangular box structure for surrounding the load of bales.

15. The bale transport system of claim 1, wherein said frame is comprised of a stationary structure.

16. The bale transport system of claim 1, wherein said frame is comprised of a vertically adjustable structure.

17. The bale transport system of claim 16, wherein said frame is comprised of a plurality of vertical support members, a plurality of actuators connected to said vertical support members, a plurality of guide members connected to said vertical support members, a plurality of telescoping members slidably positioned within said plurality of guide members, and an upper structure connected to an upper end of each of said plurality of telescoping members.

18. A bale transport system, comprising:
   a trailer;
   a cover,
   a means for supporting a cover in an open position and a closed position with respect to a frame;
   a first spool and a second spool connected to opposing portions of said cover;
   a first rear support connected between said trailer and a rear end of said first spool;
   a first front support connected between said trailer and a front end of said first spool;
   a second rear support connected between said trailer and a rear end of said second spool;
   a second front support connected between said trailer and a front end of said second spool;
   a first crank connected to said first spool;
   a second crank connected to said second spool; and
   a plurality of bale straps removably positioned within said cover and said spools when said cover is in said open position.

19. The bale transport system of claim 18, wherein said first rear support and said second rear support are comprised of telescoping structures.

20. The bale transport system of claim 18, wherein said first front support and said second front support are comprised of telescoping structures.

* * * * *